United States Patent [19]

Seragnoli

[11] Patent Number: 4,522,295

[45] Date of Patent: Jun. 11, 1985

[54] DEVICE FOR DIVIDING A STREAM OF LOOSE MATERIAL

[75] Inventor: Enzo Seragnoli, Bologna, Italy

[73] Assignee: G.D Società per Azioni, Bologna, Italy

[21] Appl. No.: 545,004

[22] Filed: Oct. 24, 1983

[30] Foreign Application Priority Data

Nov. 17, 1982 [IT] Italy .............................. 3593 A/82

[51] Int. Cl.³ ......................................... B65G 47/22
[52] U.S. Cl. ....................................... 198/493; 193/29
[58] Field of Search ................... 198/493, 445, 438; 193/29; 406/181

[56] References Cited

U.S. PATENT DOCUMENTS

| 3,185,277 | 5/1965 | Agnew | 198/438 |
| 3,387,895 | 6/1968 | Hochmuth et al. | 406/181 |
| 3,759,418 | 9/1973 | Wilson et al. | 198/438 |

Primary Examiner—Joseph E. Valenza
Assistant Examiner—Douglas C. Voorhees
Attorney, Agent, or Firm—Marshall, O'Toole, Gerstein, Murray & Bicknell

[57] ABSTRACT

Device for dividing a stream of loose material, on which one layer of material, fed in a given direction on the conveying surface of a conveyor device, is divided into at least two strips parallel to each other and to the direction of feed. At least one pair of nozzles is provided for supplying fluid pressure to each pair of adjacent strips.

5 Claims, 3 Drawing Figures

DEVICE FOR DIVIDING A STREAM OF LOOSE MATERIAL

BACKGROUND OF THE INVENTION

The present invention relates to a device for dividing a stream of loose material.

In particular, the present invention relates to a divider specially, though not exclusively designed for use in combination with a conveyor belt, for subdividing a layer of loose material on the belt into a number of separate longitudinal strips.

The following description applies specifically, though only by way of a non-limiting example, to the abovementioned application used for subdividing into strips a stream of loose shredded material, such as shredded tobacco.

A main stream of loose shredded material, consisting of a layer of the said material on a conveyor belt, is usually divided into a number of parallel secondary streams, consisting of longitudinal strips stretching along the said conveyor, by mechanical dividing devices, usually consiting of rotary cutters, arranged at a tangent to the conveying surface of the said conveyor and turning round axes perpendicular to the direction in which the said conveyor is travelling.

The known dividing devices mentioned above pose a number of drawbacks the major one of which is that the said cutters are generally unable to space the resulting longitudinal strips out crosswise, with the result that they usually tend to merge together into a single stream after cutting. What is more, the said cutters are generally unable to cut right through the thickness of the said layer in that, after a certain length of time, their diameter is worn down and the outer edge detached from the conveying surface of the said conveyor belt. Particularly when conveying loose shredded material, poorly cut shreds could result in the formation of lumps which, when wedged between the cutters and the said conveying surface, could have an unacceptable effect on the flow of the stream being divided.

Finally, operation of the said known mechanical dividers is highly limited in that they do not provide for a continuous check of the secondary streams in terms of one or more parameters, such as width, weight, volume, etc.

SUMMARY OF THE INVENTION

The aim of the present invention is to provide a stream dividing device designed to overcome the abovementioned drawbacks and limitations.

With these aims in view, the present invention relates to a device for dividing a stream of loose material, consisting of a layer of the said material fed in a given direction and contacting the conveying surface of a conveying device, into at least two secondary streams, consisting of strips of the said material parallel to each other and to the said direction of feed and arranged so as to contact the said conveying surface; the dividing device being characterised by the fact that it consists of means for supplying fluid under pressure and, for each adjacent pair of the said strips, at least one pair of nozzles for supplying the said fluid under pressure; the nozzles of each said pair being arranged facing the said conveying surface, at a greater distance from it than the thickness of the said layer, at an angle to the said conveying surface, in the same direction as the said direction of feed and essentially symmetrical with it; the speed at which the said fluid under pressure comes out of the said nozzles parallel to the said direction of feed being greater than the speed at which the said conveying surface is travelling.

BRIEF DESCRIPTION OF THE DRAWINGS

Further features and advantages of the present invention will now be described with reference to the attached drawings, provided by way of a non-limiting example, in which.

DETAILED DESCRIPTION OF THE INVENTION

Figure 1:
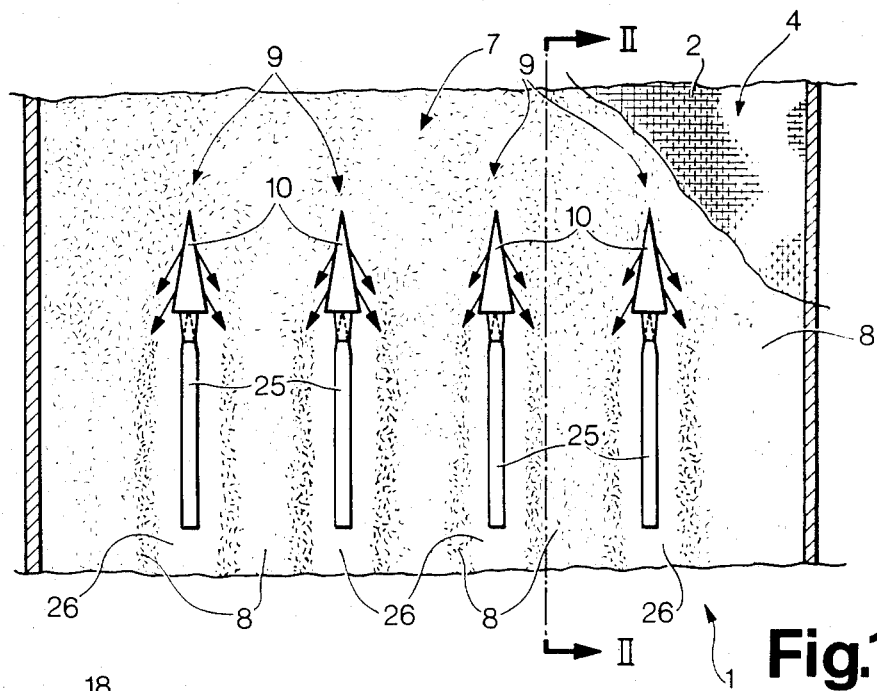
FIG. 1 shows a part plan view of a loose material conveying device fitted with a stream dividing device according to the present invention.
Figure 2:
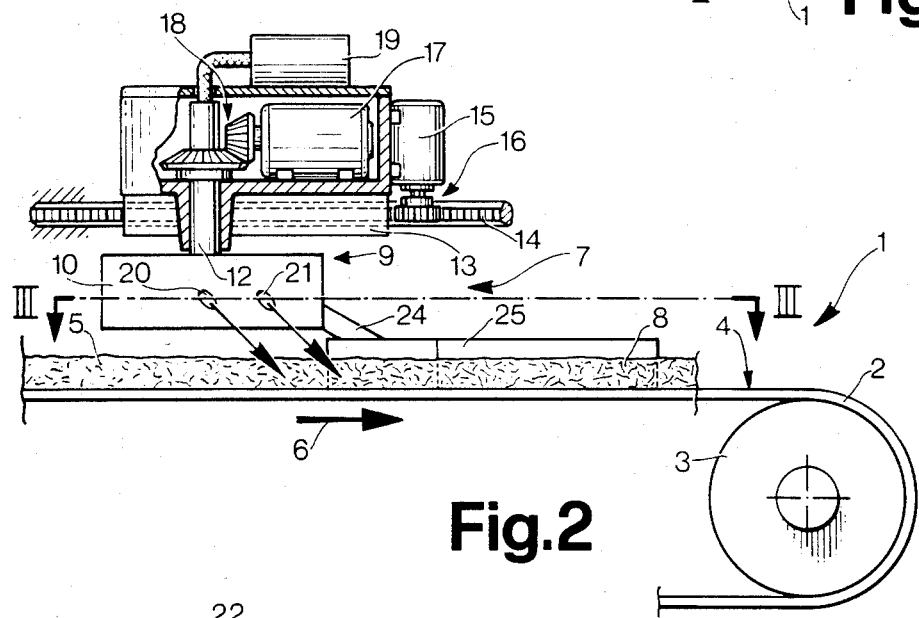
FIG. 2 shows a section along line II—II of FIG. 1.

FIG. 1 and particularly FIG. 2 show a conveyor (1) consisting of a belt (2) wound round rollers (3) only one of which is shown. When driven by means not shown in the drawing, conveyor 1 supplies a continuous stream of loose material, e.g. shredded tobacco, arranged in contact with conveying surface 4 on belt 2 and consisting of an essentially uniform layer (5) of the said material moving in the direction of arrow 6.

Facing surface 4 is a dividing device, indicated as a whole by number 7, designed to divide the said stream of loose material into a number of secondary streams, each consisting of a strip (8) of material moving in the direction of arrow 6 and in contact with surface 4.

For each pair of adjacent strips 8, the dividing device consists of a dividing unit (9), in turn consisting of a hollow, prism-shaped supporting body (10) with an essentially triangular base and an essentially triangular inside chamber (11) arranged with its tip in the opposite direction to arrow 6. The hollow body (10) is connected to a free end of tubular shaft 12, which is essentially perpendicular to surface 4 and sufficiently far from it to ensure that the distance between body 10 and surface 4 is kept greater than the thickness of layer 5.

The other end of shaft 12, opposite the one connected to body 10, is connected, so as to turn round a fixed axis, to slide 13, which runs along rail 14, parallel to arrow 6, powered by drive means consisting of a motor (15) connected to a rack and pinion assembly (16) between rail 14 and slide 13. The angle of shaft 12 is controlled by drive means consisting of motor 17, supported on slide 13 and connected to shaft 12 by bevel gear pair 18.

As shown in FIG. 2, slide 13 is fitted with a compressed air source or supply means (19) one outlet of which communicates with the inside of tubular shaft 12 and, through it, with chamber 11 on hollow body 10.

Figure 3:
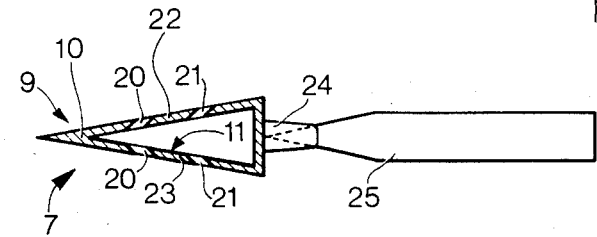
FIG. 3 shows a section along line III—III of FIG. 2.

As shown in FIGS. 2 and 3, chamber 11 comes out through two pairs of holes or nozzles (20, 21) one of which may be dispensed with. Nozzles 20 and 21 on each pair extend through opposite side walls 22 and 23 on body 10 and are arranged at an angle to both surface 4 and the direction of arrow 6 and at a diverging angle in relation to an axis on body 10 parallel to arrow 6.

At the downstream end of body 10, in the direction of belt 2 indicated by arrow 6, a dividing flap (25) is connected by means of bracket 24, the said flap being wedge-shaped at the end, extending parallel to arrow 6 and skimming surface 4 of belt 2.

When in use, the jets of compressed air aimed by nozzles 20 and 21 on to layer 5 moving along on belt 2 in the direction of arrow 6 shift aside the material moving under body 10 so as to form a strip (26) along which surface 4 remains clear. The axis of the said strip (26) is occupied by dividing flap 25 which may even be dispensed with and the function of which is to separate the air jets from nozzles 20 and 21 on opposite sides of body 10.

To clear strips 26, the speed of the compressed air jets in the direction of arrow 6 need not necessarily be high in relation to the speed of belt 2. The speed of the jets in the direction of arrow 6 need only be a few percent, e.g. 10%, higher than that of belt 2.

Each strip (26) defines two adjacent strips (8) which, moving along conveyor 1, define streams of material the capacity of which can be regulated on the basis of various parameters. For example, by fitting a dynamic weighing device (not shown) under belt 2 and downstream from dividing device 7, the angle of each body (10) around the axis of shaft 12 can be checked so that strips 8 are perfectly equal in weight.

By means of drive motor 15, it is possible to regulate the point along belt 2 at which layer 5 is divided into strips in relation to the position of other connected equipment not shown, so as to allow the material shifted aside to clear strips 26 to settle completely before reaching the said connected equipment.

To those skilled in the art it will be clear that changes can be made to the dividing device (7) described by way of a non-limiting example without, however, departing from the scope of the present invention.

For example, on an alternative arrangement not shown, shaft 12 could be made in two parts connected telescopically with a micrometric adjusting device inbetween for regulating the distance between each body 10 and surface 4.

I claim:

1. Device (7) for dividing a stream of loose material into at least two secondary streams, said loose material consisting of a layer (5) of said material fed in a given direction (6) on the conveying surface (4) of a conveying device (1), said secondary streams consisting of strips (8) of said material parallel to each other and to the direction of feed (6) and arranged so as to contact said conveying surface (4); the dividing device (7) comprising means (19) for supplying fluid under pressure to each adjacent pair of the said strips (8), at least one pair of nozzles (20, 21) for supplying the said fluid under pressure; the nozzles (20, 21) of each said pair being arranged facing the said conveying surface (4), at a greater distance from it than the thickness of the said layer (5), at an angle to the said conveying surface (4), in the same direction as the said direction of feed (6) and essentially symmetrical with it; the speed at which the said fluid under pressure comes out of the said nozzles (20, 21) parallel to the said direction of feed (6) being greater than the speed at which the said conveying surface (4) is travelling.

2. Device according to claim 1, wherein at least one pair of nozzles (20, 21) rests on a supporting body (10) assembled so as to turn round an axis essentially perpendicular to the said conveying surface (4); first adjustable drive means (17) being provided for positioning the said supporting body (10) at any angle round the said axis.

3. Device according to claim 1, wherein said at least one pair of nozzles (20, 21) rests on a supporting body (10) facing the said conveying surface (4) and positioned so as to be adjustable in a direction essentially parallel to the said feed direction (6), second drive means (15) being provide for shifting the said supporting body (10) in the said direction (6).

4. Device according to claim 1, further including a flap (25) arranged at a tangent to the said conveying surface (4) and essentially perpendicular to it, said flap being connected to each said supporting body (10) from which it extends in a direction essentially parallel to the said direction of feed (6).

5. Device according to claim 2, wherein said supporting body consist of a hollow body (10) with an inside chamber (11) communicating, on one side, with the said means (19) for supplying the said fluid under pressure and, on another side, with the outsitde atmosphere, through side holes defining the said nozzles (20, 21).

* * * * *